(12) United States Patent
Kim (10) Patent No.: US 8,395,694 B2
(45) Date of Patent: Mar. 12, 2013

(54) APPARATUS AND METHOD FOR BLURRING IMAGE BACKGROUND IN DIGITAL IMAGE PROCESSING DEVICE

(75) Inventor: Young-geol Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 906 days.

(21) Appl. No.: 12/290,428

(22) Filed: Oct. 30, 2008

(65) Prior Publication Data

US 2009/0160963 A1 Jun. 25, 2009

(30) Foreign Application Priority Data

Dec. 21, 2007 (KR) .......................... 10-2007-0135734

(51) Int. Cl.
*H04N 5/232* (2006.01)

(52) U.S. Cl. ................. 348/345; 348/220.1; 348/208.12

(58) Field of Classification Search ............... 348/220.1, 348/208.12, 326, 345, 346, E9.048, E5.045; 382/254, 255

See application file for complete search history.

(56) References Cited

U.S. PATENT DOCUMENTS

| 7,176,975 B2 * | 2/2007 | Matsunaga et al. ........... 348/345 |
| 2002/0191100 A1 * | 12/2002 | Matsunaga et al. ........... 348/345 |
| 2005/0128312 A1 * | 6/2005 | Fredlund et al. ........... 348/222.1 |
| 2005/0264680 A1 * | 12/2005 | Yajima ......................... 348/345 |
| 2007/0001014 A1 * | 1/2007 | Bremer et al. ........... 235/462.33 |
| 2007/0071304 A1 * | 3/2007 | Kuchii et al. ................. 382/141 |
| 2007/0071432 A1 * | 3/2007 | Senba ........................... 396/121 |
| 2007/0229797 A1 * | 10/2007 | Sugimoto ..................... 356/4.03 |

FOREIGN PATENT DOCUMENTS

| JP | 04071070 A | * | 3/1992 |
| JP | 2002-112095 A | | 4/2002 |
| JP | 2002300445 A | * | 10/2002 |
| JP | 2003-008966 A | | 1/2003 |
| JP | 2003-209727 A | | 7/2003 |
| JP | 2005-229198 A | | 8/2005 |
| JP | 2005-354333 A | | 12/2005 |
| KR | 10-2006-0062890 A | | 6/2006 |

OTHER PUBLICATIONS

Office Action established for CN 200810184611.0 (Mar. 31, 2012).

* cited by examiner

*Primary Examiner* — Roberto Velez
*Assistant Examiner* — Yih-Sien Kao
(74) *Attorney, Agent, or Firm* — Drinker Biddle & Reath LLP

(57) ABSTRACT

Provided is a method and apparatus for blurring an image background, in which a moving image information and a focal distance information, which is matched to the moving image according to a movement distance of an AF motor, are obtained for the same object and background blurring is applied to a still image differentially, based on focal distances of the moving image and the still image. The apparatus includes a digital signal processing unit capturing a moving image and a still image of the same object, comparing focal distances of at least one frame forming the moving image with focal distances of the still image, and applying background blurring to the still image according to differences between the focal distances.

15 Claims, 10 Drawing Sheets

(a) FOCAL DISTANCES OBTAINED BY EXTRACTION OF DIVISION REGIONS HAVING MOST HIGH-FREQUENCY COMPONENTS FROM MOVING IMAGE (b) FOCAL DISTANCES OF STILL IMAGE (c) SUBTRACTION RESULT
0: DIVISION REGION THAT DOES NOT REQUIRE BACKGROUND BLURRING
1,2,3 : DIVISION REGION THAT REQUIRES DIFFERENT BACKGROUND BLURRING ACCORDING TO SUBTRACTION RESULT

AF MOTOR | MINIMUM ←── FOCAL DISTANCE ──→ INFINITE (a) CAPTURING OF MOVING IMAGE FIRST
MANIPULATIONUPON A FIRST MANIPULATION
OF SHUTTER-RELEASE BUTTON (b) CAPTURING OF STILL IMAGE UPON A SECOND
MANIPULATION OF SHUTTER-RELEASE BUTTON
(STORE OPTIMAL FOCAL DISTANCE)

FIG. 5

(a) REGION DIVISION (b) EXTRACT HIGH-FREQUENCY COMPONENTS FROM SAME DIVISION REGIONS OF FRAMES

APPARATUS AND METHOD FOR BLURRING IMAGE BACKGROUND IN DIGITAL IMAGE PROCESSING DEVICE

CROSS-REFERENCE TO RELATED PATENT APPLICATION

This application claims the benefit of Korean Patent Application No. 10-2007-0135734, filed on Dec. 21, 2007, in the Korean Intellectual Property Office, the disclosure of which is incorporated herein in its entirety by reference.

BACKGROUND OF THE INVENTION

1. Field of the Invention

The present invention generally relates to a digital image processing device and an operating method thereof, and more particularly, to a method and apparatus for blurring an image background, whereby a moving image and focal distance information matched to the moving image according to a movement distance of an AF motor are obtained for the same object and background blurring is applied to a still image differentially, based on focal distances of the moving image and the still image.

2. Description of the Related Art

At present, commonly used digital image processing devices such as digital cameras, camera phones, smart phones, and the like include various digital elements for processing digitized data, thereby providing functions distinguished from those of analog photographing equipment.

For example, the digital image processing devices can store a large amount of image data, which far exceeds the amount of image data that can be stored in a conventional film, by using a large-capacity memory included therein, in which a charge coupled device (CCD) and the memory substitutes for a film in order to form a high-pixel image, thereby sharing image data with a personal computer (PC) and providing convenience in image processing.

Moreover, the digital image processing devices provide a higher number of functions, such as auto adjustment of shutter speed and aperture, auto focus, image enhancement, auto adjustment of light intensity, and the like, compared to those provided by analog photographing equipment.

However, since analog photographing equipment is manually operated, it may be preferred over the digital image processing devices when an expert delicately works with the analog photographing equipment.

In this regard, recently released digital image processing devices also implement unique functions of conventional analog image processing devices as well as beneficial functions of digital devices. In other words, the digital image processing devices integrate unique strong points of analog devices to overcome the challenges of digital devices and thus can provide various and specialized functions.

Moreover, with the wide spread use of digital image processing devices, the number of people who are interested in photography is gradually increasing and thus, the number of users who acquire professional photographing skills is also increasing.

However, the digital image processing devices are still deficient to meet professional users' demands in many aspects.

For example, in most cases with figure photographing, an out-of-focus effect is generally used. When a conventional digital image processing device is used, the implementation of the out-of-focus effect is almost impossible due to a lens and a CCD having limited sizes.

In general, the out-of-focus effect differs with the size of a "circle of confusion" and the size of the circle of confusion is closely associated with depth such as a depth of focus and a depth of field. When a dot of an object image is focused through a lens, it is focused in the form of a circular dot having a predetermined diameter from the minimum size that can be recognized as a dot. As the diameter of the dot increases, human eyes recognize the dot as being blurred. The circular dot which has the diameter that causes the dot to appear blurred is referred to as the circle of confusion. Thus, the depth depends on factors associated with the circle of confusion, such as the CCD size, the aperture, and the lens focal distance of a digital image processing device, a camera-to-object distance, and an object-to-background distance.

Among those factors that determine the depth, an image sensor, the aperture, and the lens focal distance, except for the camera-to-object distance, change by a large amount according to physical specifications of the digital image processing device. Due to the nature of a miniaturized digital image processing device, the digital image processing device can express only a deep depth at all times due to a small-size image sensor and a small-diameter lens, resulting in a failure to meet a user's need for a shallow depth (of field) in which a main object is clear while a background is blurred.

Moreover, when a large-sized image sensor and a large-diameter lens are adopted for optical features, such adoption may be associated with the yield of semiconductor processing for manufacturing the large-sized image sensor and may increase the cost and size of the digital image processing device because of a need to design the large-diameter lens, thereby hindering miniaturization of the digital image processing device.

SUMMARY OF THE INVENTION

The present invention provides a method and apparatus for a digital image processing device (e.g., a digital camera) to blur an image background, whereby a moving image and focal distance information matched to the moving image according to a movement distance of an AF motor are obtained for the same object and background blurring is applied to a still image differentially, based on focal distances of the moving image and the still image.

According to an aspect of the present invention, there is provided an apparatus for blurring an image background as a digital image processing device. The apparatus includes a digital signal processing unit capturing a moving image and a still image of the same object, comparing focal distances of at least one frame forming the moving image with focal distances of the still image, and applying background blurring to the still image according to differences between the focal distances.

The digital signal processing unit may photograph the moving image upon a first manipulation of a shutter-release button and photograph the still image upon a second manipulation of the shutter-release button after the first manipulation.

The digital signal processing unit may move an AF motor from a home position to an infinite position during capturing of the moving image.

The digital signal processing unit may include a focal distance calculation unit detecting the focal distances from the at least one frame forming the moving image, a comparison unit comparing the focal distances of the at least one frame with the focal distances of the still image, which are recorded at the time of capturing of the still image, and a control unit controlling background blurring to be applied to a predetermined portion of the still image in which a focal distance of the still image is different from that of the at least one frame.

The focal distance calculation unit may match focal distance information of the AF motor to each of the at least one frame and records the focal distance information in each of the at least one frame.

The focal distance calculation may include a region division unit dividing each of the at least one frame into predetermined regions and a high-frequency component extraction unit extracting high-frequency components from the same division regions of the at least one frame, wherein the control unit may detect the division region having a largest number of high-frequency components and a focal distance of the detected division region.

The high-frequency component extraction unit may extract the high-frequency components by differentiating brightness data of the same division regions of the at least one frame.

The control unit may compare the extracted high-frequency components with a reference value, store a focal distance of a frame corresponding to the extracted high-frequency component that is greater than the reference value, and determine a division region corresponding to the extracted high-frequency component that is less than the reference value as noise and discard high-frequency components of the division region.

The control unit may determine a division region having the high-frequency components that are different from those of neighboring division regions around the division region as noise and overwrite the high-frequency components of the neighboring division regions in the high-frequency components of the division region determined as noise.

The comparison unit may calculate a difference between the focal distance of the division region having a largest number of high-frequency components and a focal distance of a corresponding division region of the still image.

The control unit may apply background blurring to a division region of the still image in which a focal distance of the division region of the still image is different from that of the division region having a largest number of high-frequency components.

According to another aspect of the present invention, there is provided an example method of blurring an image background as an operation method of a digital image processing device. The method includes: (a) capturing a moving image and a still image of the same object; and (b) comparing focal distances of at least one frame forming the moving image with focal distances of the still image and applying background blurring to the still image according to differences between the focal distances.

Operation (a) may include (a-1) photographing the moving image upon a first manipulation of a shutter-release button and (a-2) photographing the still image upon a second manipulation of the shutter-release button after the first manipulation.

Operation (b) may include (b-1) detecting the focal distances from the at least one frame forming the moving image, (b-2) comparing the focal distances of the at least one frame with the focal distances of the still image, which are recorded at the time of capturing of the still image, and (b-3) controlling background blurring to be applied to a predetermined portion of the still image in which a focal distance of the still image is different from that of the at least one frame.

Operation (b-1) may include (b-11) matching focal distance information of the AF motor to each of the at least one frame and recording the focal distance information in each of the at least one frame, (b-12) dividing each of the at least one frame into predetermined regions, (b-13) extracting high-frequency components from the same division regions of the at least one frame, and (b-14) detecting the division region having a largest number of high-frequency components and a focal distance of the detected division region.

Operation (b-13) may include extracting the high-frequency components by differentiating brightness data of the same division regions of the at least one frame.

Operation (b-2) may include calculating a difference between the focal distance of the division region having a largest number of high-frequency components and a focal distance of a corresponding division region of the still image.

Operation (b-3) may include applying background blurring to a division region of the still image in which a focal distance of the division region of the still image is different from that of the division region having a largest number of high-frequency components.

BRIEF DESCRIPTION OF THE DRAWINGS

The above and other features and advantages of the present invention will become more apparent by describing in detail an embodiment thereof with reference to the attached drawings in which:

FIG. 4, portions (a) and (b) thereof being referred to herein as 4A and 4B, illustrates views for respectively explaining capturing of a moving image and a still image of the same object in the apparatus illustrated in FIG. 3;

FIG. 5, portions (a) and (b) thereof being referred to herein as 5A and 5B, are views for respectively explaining region division of a moving picture frame and extraction of high-frequency components performed in the apparatus illustrated in FIG. 3;

FIGS. 7, portions (a) through (c) thereof being referred to herein as 7A through 7C are views for explaining selection of whether to apply background blurring by comparing a focal distance of a moving image frame with a focal distance of a still image, performed in the apparatus illustrated in FIG. 3;

DETAILED DESCRIPTION OF THE INVENTION

Hereinafter, an embodiment of the present invention will be described in detail with reference to the accompanying drawings. It should be noted that like reference numerals refer to like elements illustrated in one or more of the drawings. In the following description of the present invention, detailed descriptions of known functions and configurations incorporated herein will be omitted for conciseness and clarity.

Figure 1:
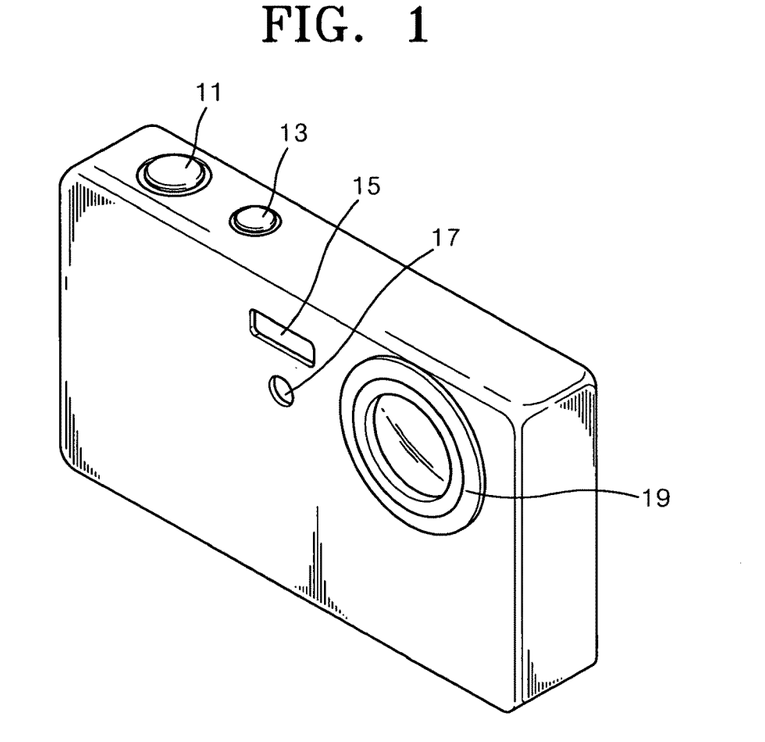
FIG. 1 is a perspective view illustrating the front and top of a digital image processing device.

FIG. 1 is a perspective view illustrating the front and top of a digital image processing device. Referring to FIG. 1, the digital image processing device includes a shutter-release button 11, a power button 13, a flash 15, a sub light 17, and a lens unit 19 in its front and top.

The shutter-release button 11 is actuated by a user in order to expose a charge coupled device (CCD) or a film to light for a predetermined amount of time so that an image is captured by the CCD by appropriately exposing an object in cooperation with an iris (not shown).

The shutter-release button 11 generates a first photographing signal and a second photographing signal according to a user input. Upon a first manipulation of the shutter-release button 11 to generate a half-shutter signal, the digital image processing device adjusts a focus and the amount of light. When the digital image processing device is in focus, a focus indicator (e.g., a green light or indicia) is may be turned on (e.g., on the display unit shown in FIG. 2). After the digital image processing device finishes focusing and adjusting the amount of light in response to the first manipulation of the shutter-release button 11, the shutter-release button 11 is manipulated a second time so as to generate a full-shutter signal for photographing.

The power button 13 is actuated by a user in order to operate the digital image processing device by supplying power to the digital image processing device.

The flash 15 momentarily illuminates an object for photographing in a dark environment. The flash 15 has flash modes such as auto flash, fill flash, flash off, red-eye reduction, slow sync, and the like.

The sub light 17 illuminates an object in order to allow the digital image processing device to quickly and accurately adjust a focus in an automatic manner in insufficient light or night photographing conditions.

The lens unit 19 receives light reflected from a subject so that the digital image processing device processes an image.

Figure 2:
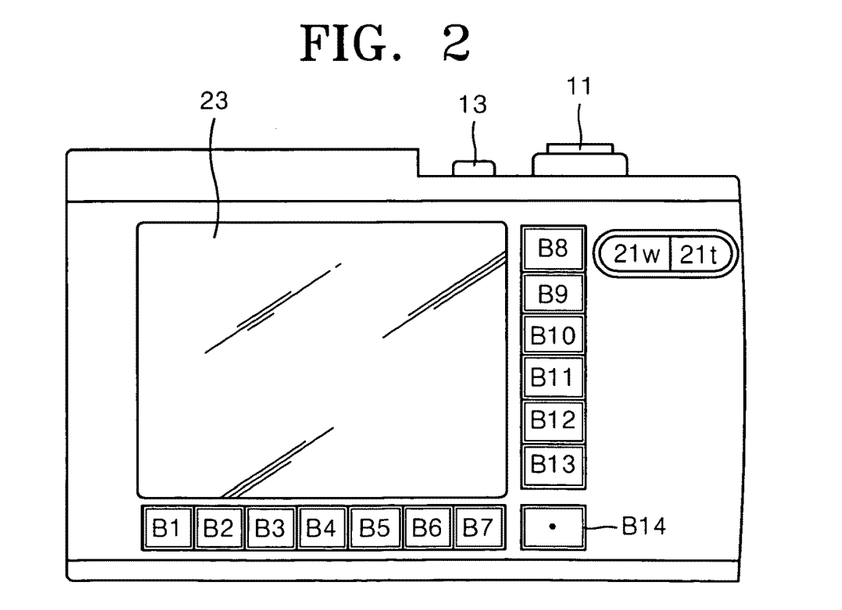
FIG. 2 is a back view of the digital image processing device illustrated in FIG. 1.

FIG. 2 is a back view of the digital image processing device illustrated in FIG. 1. Referring to FIG. 2, the digital image processing device includes a wide-angle zoom button 21w, a telephoto zoom button 21t, a display unit 23, and input buttons B1 through B14.

When the wide-angle zoom button 21w or the telephoto zoom button 21t is actuated by a user, the angle of view becomes wider or narrower. In particular, the wide-angle zoom button 21w or the telephoto zoom button 21t is input in order to change the size of a selected exposure region. The size of the selected exposure region is reduced upon input of the wide-angle zoom button 21w, and the size of the selected exposure region increases upon input of the telephoto zoom button 21t.

The input buttons B1 through B14 are provided in a horizontal line and a vertical line along two sides of the display unit 23. The input buttons B1 through B14 may include touch sensors (not shown) or contact switches (not shown).

In other words, when the input buttons B1 through B14 have touch sensors, the user can select an arbitrary value, e.g., color or brightness, from a main menu item or can activate a sub menu icon included in a main menu icon, by moving a finger up/down/left/right while touching the buttons B1 through B7 in the horizontal line or the buttons B8 through B14 in the vertical line.

When the input buttons B1 through B14 have contact switches, the user can execute a desired function by directly selecting a main menu icon and a sub menu icon thereof. A touch sensor input requires a weak touch when compared to a contact switch input, but the contact switch input requires a strong touch when compared to the touch sensor input.

Figure 3:
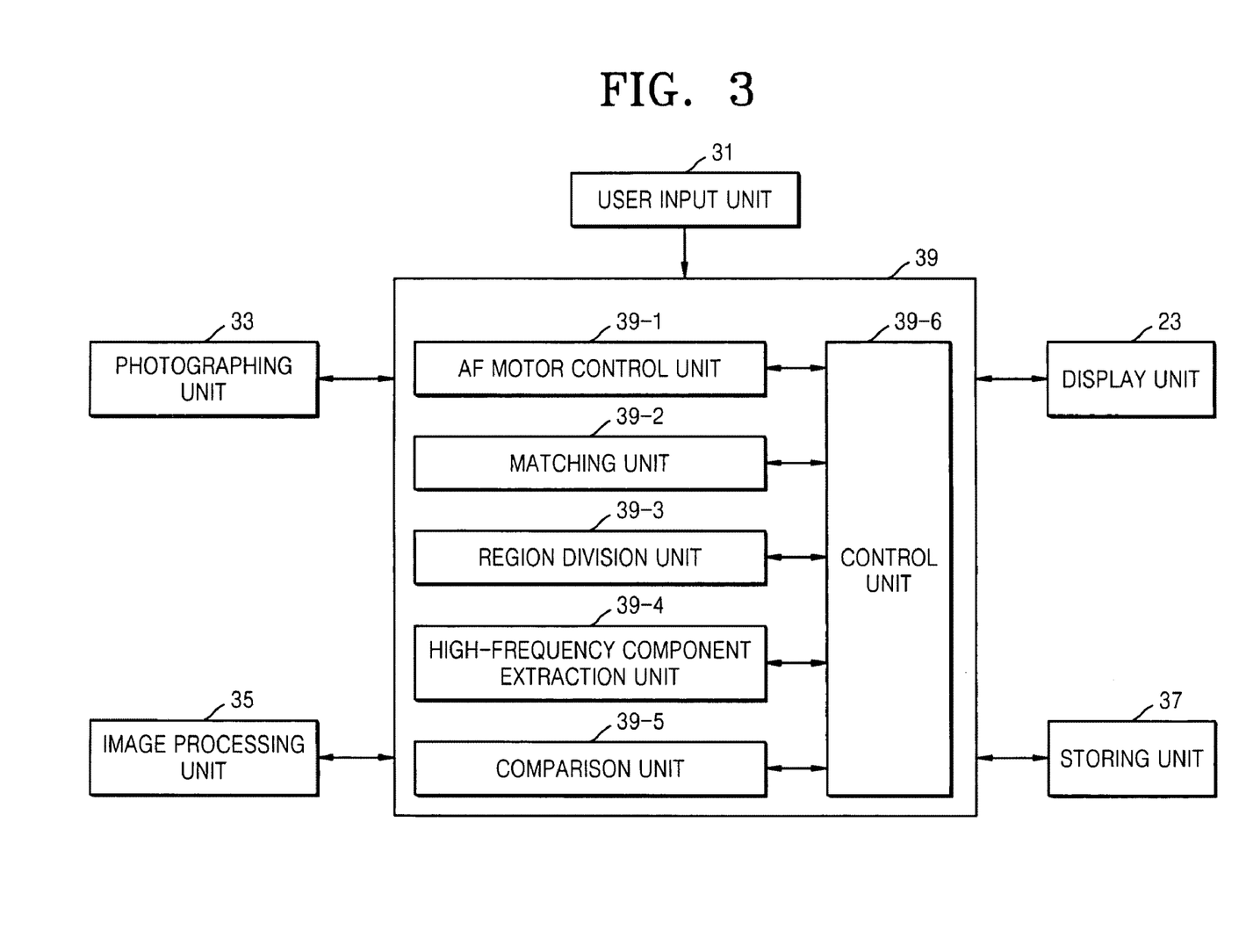
FIG. 3 is a block diagram of an apparatus for blurring a background according to an embodiment of the present invention.

FIG. 3 is a block diagram of an apparatus for blurring a background according to an embodiment of the present invention. Referring to FIG. 3, the apparatus includes the display unit 23, a user input unit 31, a photographing unit 33, an image processing unit 35, a storing unit 37, and a digital signal processing unit 39.

The user input unit 31 includes the shutter-release button 11 that is used to open or close an iris to expose a CCD or a film to light for a predetermined amount of time, the power button 13 that is manipulated to supply power, the wide-angle zoom button 21w and the telephoto zoom button 21t are manipulated to increase or reduce the angle of view, and the buttons B1 through B14 that have touch sensors or contact switches and are provided in a horizontal line and a vertical line around the display unit 23.

The photographing unit 33 includes a shutter, a lens unit, a motor unit, an iris, a CCD, and an analog-to-digital converter (ADC) that are not shown in the figures. The shutter is used to adjust the amount of light for light exposure in cooperation with the iris. The lens unit receives light from an external light source and processes an image. The iris adjusts the amount of incident light according to the amount of opening/closing thereof. The amount of opening/closing of the iris is controlled by the digital signal processing unit 39.

In an auto-focus mode, the focus motor is driven by controlling a focus lens under control of the digital signal processing unit 39. Thus, the focus lens is moved from a forefront position to a rearmost position. In this stage, a position of the focus lens at which there is a largest number of high-frequency components of an image signal, e.g., the number of driving steps of the focus motor, is set.

The CCD accumulates the amount of light input through the lens unit and outputs an image captured through the lens unit in synchronization with a vertical sync signal according to the accumulated amount of light. The digital image processing device can obtain an image by means of the CCD that converts light reflected from an object into an electric signal. In order to obtain a color image using the CCD, a color filter is required and a color filter array (CFA) is generally used as a filter (not shown).

The CFA has a structure in which filters pass light expressing only one color for each pixel and are regularly arranged, and may take various forms according to its arrangement structure. The ADC converts an analog image signal output from the CCD into a digital signal.

The image processing unit 35 performs signal processing to allow digital-converted raw data to be displayed. The image processing unit 35 removes a black level caused by dark current in the CCD and the CFA that are sensitive to temperature change.

The image processing unit 35 performs gamma correction for encoding information in consideration of the nonlinearity of human vision. The image processing unit 35 performs CFA interpolation by interpolating a Bayer pattern implemented by RGRG lines and GBGB lines of gamma-corrected predetermined data into RGB lines.

The image processing unit 35 converts the interpolated RGB signal into a YUV signal, performs edge compensation by filtering Y signals by using a high-pass filter and color correction by correcting color values of U and V signals by using a standard color coordinate system, and removes noise from the U and V signals.

The image processing unit 35 compresses and signal-processes the YUV signals from which noise has been removed, and generates a JPEG file. The JPEG file is displayed in the display unit 23 and is stored in the storing unit 37. The image processing unit 35 operates under the control of or in cooperation with the digital signal processing unit 39.

In the present apparatus and method, once a moving image and a still image of the same object are photographed, the digital signal processing unit 39 compares a focal distance of at least one frame forming the moving image with a focal distance of the still image. According to a difference between the focal distances, the digital signal processing unit 39 applies background blurring to the still image.

To this end, the digital signal processing unit 39 includes an AF (auto-focus) motor control unit 39-1, a matching unit 39-2, a region division unit 39-3, a high-frequency component extraction unit 39-4, a comparison unit 39-5, and a control unit 39-6.

The AF motor control unit 39-1 moves an AF motor from a home position to an infinite focal distance position (also known as an infinity position) during capturing of the moving image of the same object.

Figure 4:
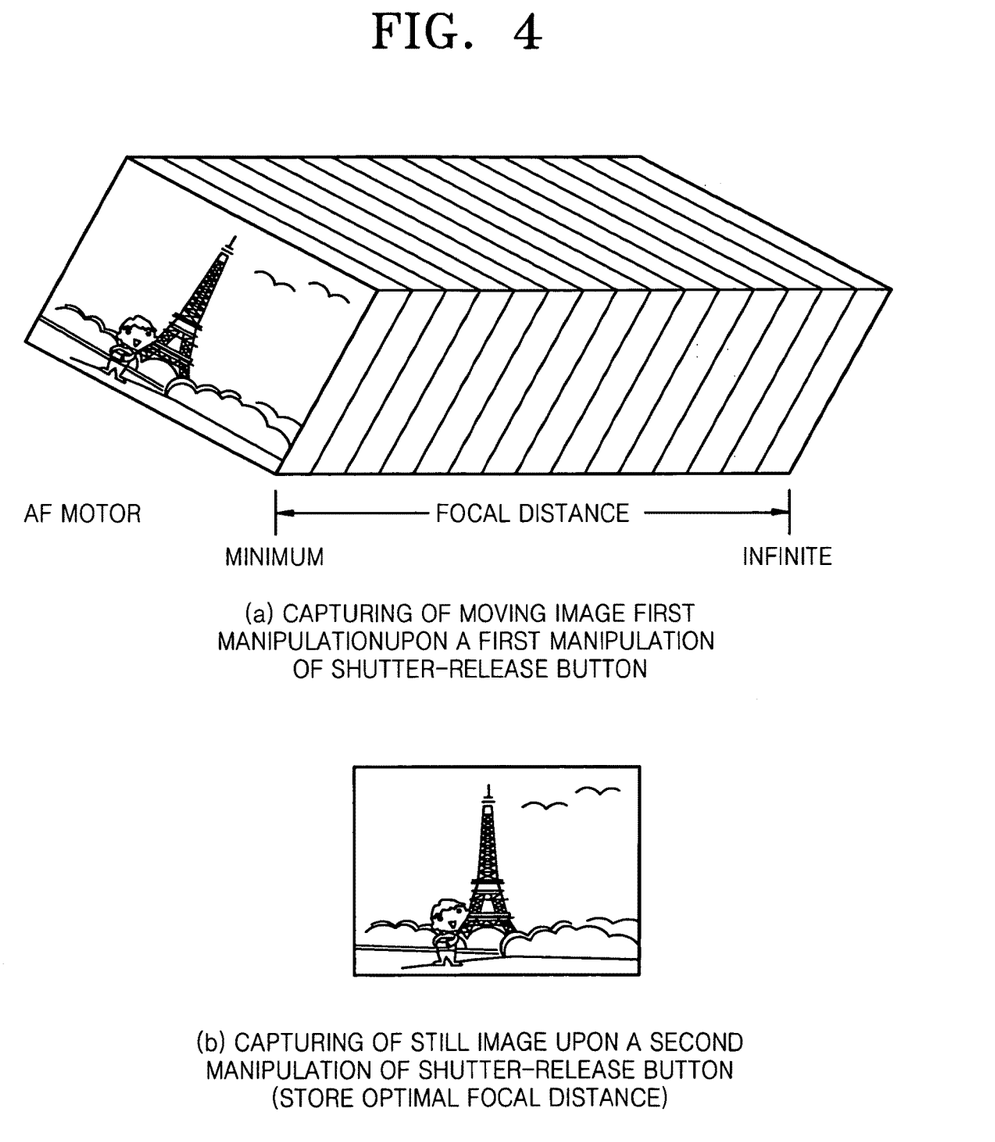

As illustrated in FIG. 4A, for the same object, upon a first manipulation of the shutter-release button 11 through the user input unit 31, the AF motor control unit 39-1 moves the AF motor from the home position up to an infinite focal distance under the control of the control unit 39-6, the photographing unit 33 photographs a moving image, and the photographed moving image is stored in the storing unit 37 or a buffer (not shown). The moving image can be photographed at a rate of, for example 30 or 15 frames per second. Accuracy can be improved by setting a high rate of frames per second during moving image photographing.

Upon completion of moving image capturing with movement of the AF motor from home position to the infinite focal distance, the shutter-release button 11 is manipulated a second time and a still image is captured as illustrated in FIG. 4B. The captured still image contains optimal focal distance information.

The matching unit 39-2 matches a distance (focal distance) per moving time of the AF motor to each frame of the moving image stored in the storing unit 37 or the buffer, and then extracts each frame. For extraction of frames having accurate data, low-efficiency compression is desirable.

Figure 5:
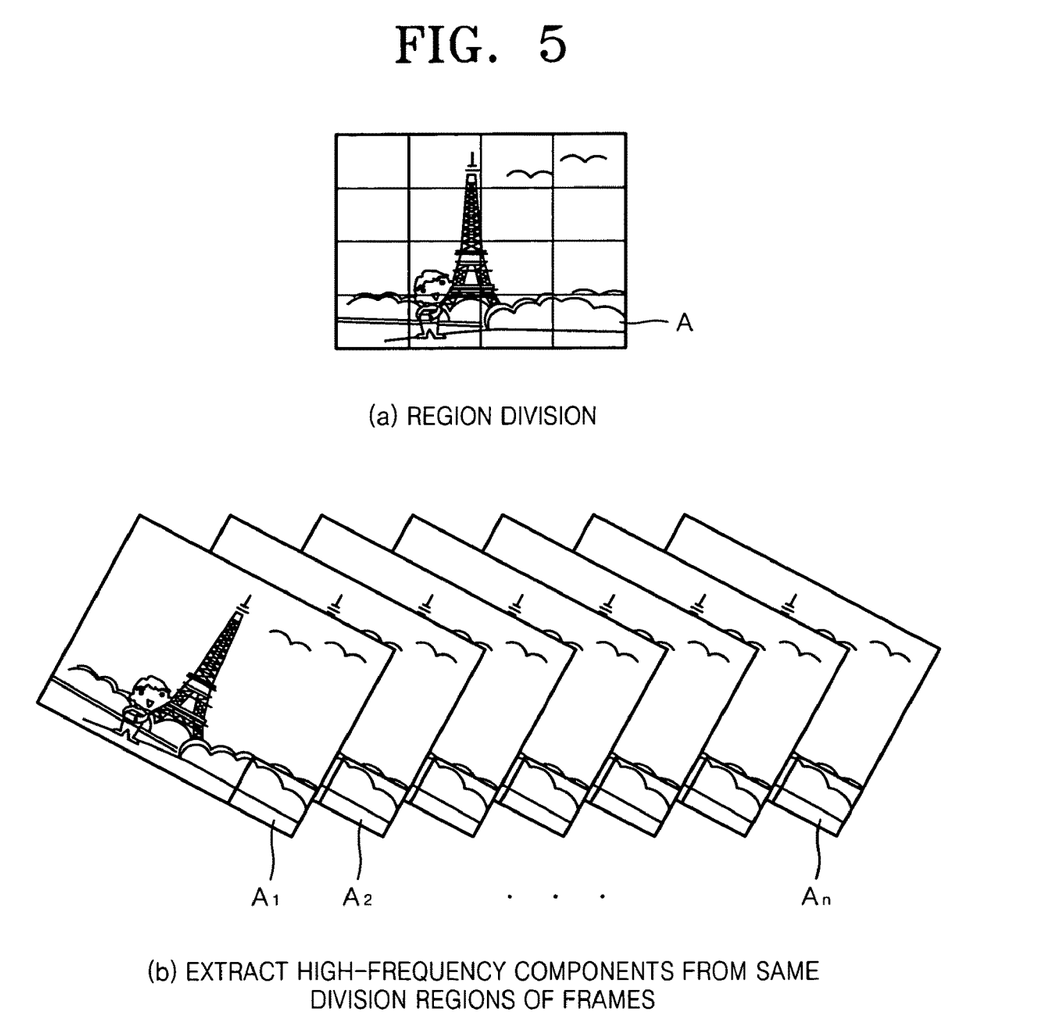

The region division unit 39-3 divides each of the extracted frames into blocks having a predetermined size, e.g., 4×4-pixel blocks, as illustrated in FIG. 5A.

As illustrated in FIG. 5B, the high-frequency component extraction unit 39-4 extracts high-frequency components from the same division regions $A_1$ through $A_n$ of all the extracted frames (e.g., the lower right-hand corner of the images as shown), and then sequentially extracts high-frequency components from the other same division regions of the extracted frames, thereby extracting high-frequency components from all division regions of each of the extracted frames. The high-frequency extraction unit 39-4 extracts high-frequency components of an image signal by primary and secondary differentiations of brightness data of the same division regions $A_1$ through $A_n$ of all the extracted frames.

Figure 6:
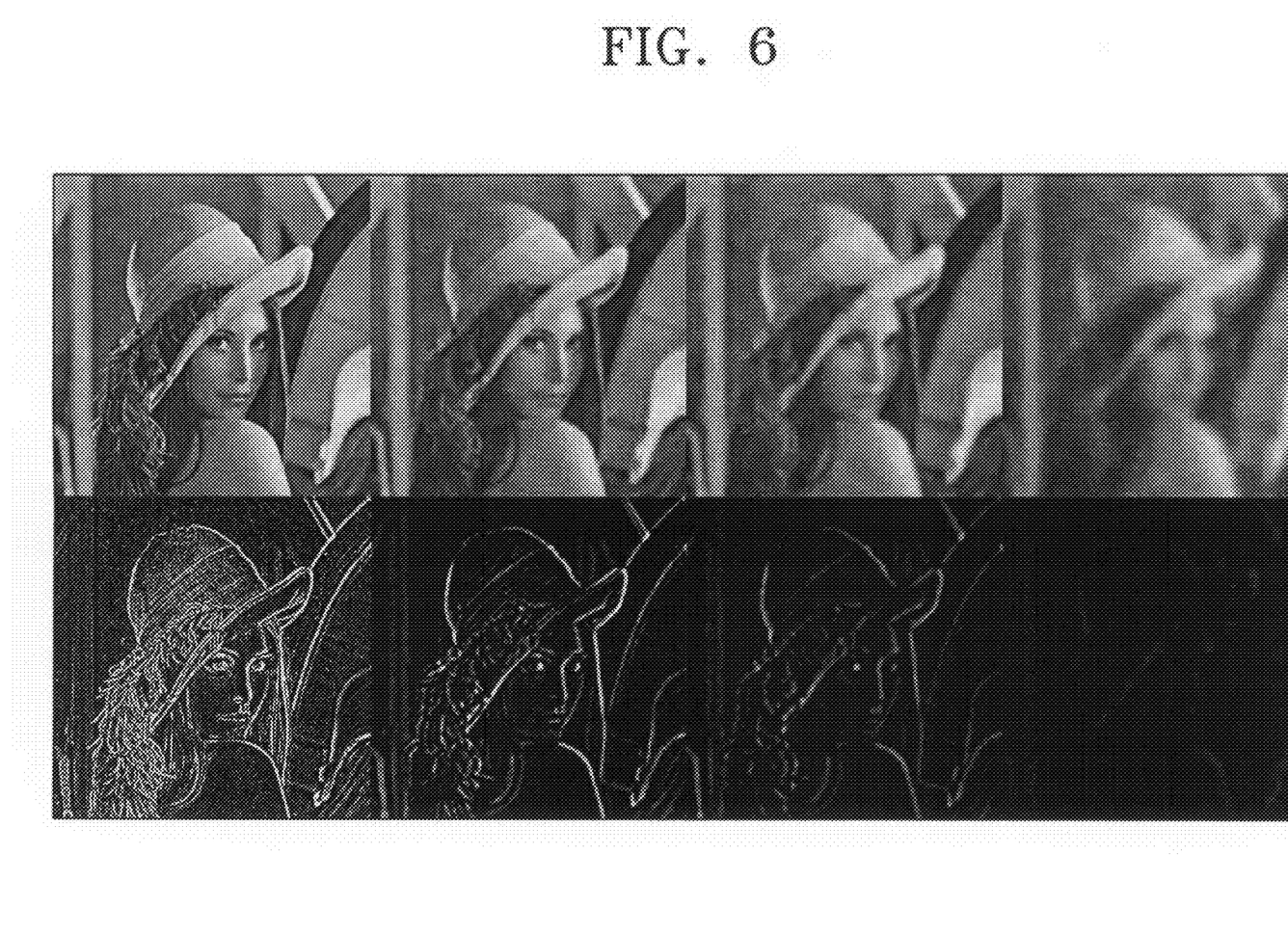
FIG. 6 is a view for explaining a high-frequency component extraction unit of the apparatus illustrated in FIG. 3.

FIG. 6 illustrates images for explaining an effect achieved when the high-frequency component extraction unit 39-4 differentiates an image. In FIG. 6, the upper leftmost image is in focus and images toward the right side of the upper leftmost image gradually go out of focus. In FIG. 6, lower images are resultant images (e.g., edge images) obtained by differentiating the upper images. In the lower images, an image having more white portions also has more high-frequency components. As can be appreciated, images with more high-frequency components are better focused.

Figure 7:
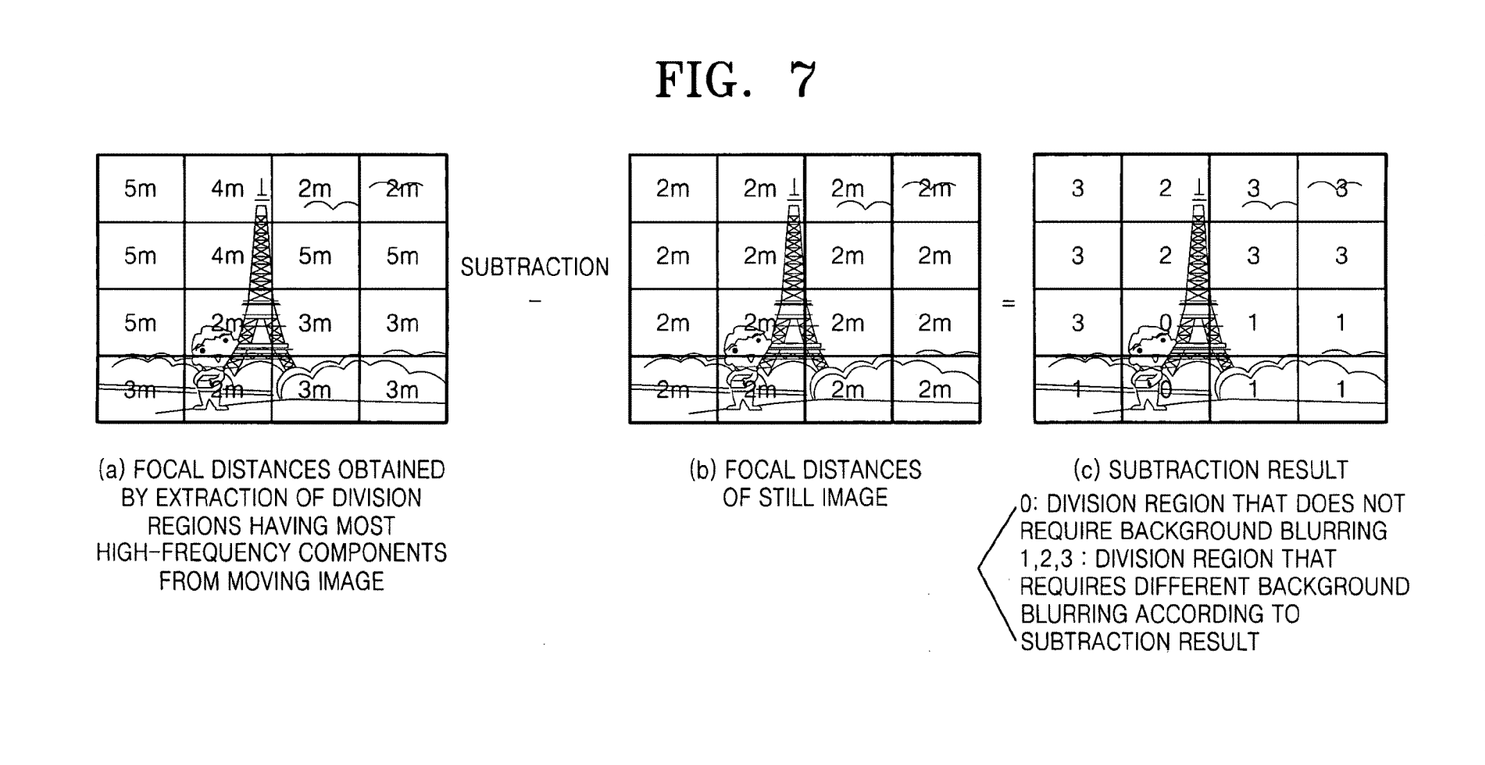

The high frequency components of each division region A, which are extracted by the high-frequency component extraction unit 39-4, are output to the control unit 39-6. The control unit 39-6 then compares the extracted high-frequency components with a reference value, stores a focal distance of a frame corresponding to the extracted high-frequency component that is greater than the reference value, and determines a division region corresponding to the extracted high-frequency component that is less than the reference value as noise and discards high-frequency components of the division region. The control unit 39-6 then detects a division region having a largest number of high-frequency components and a focal distance of the division region. FIG. 7A illustrates a frame composed of division regions having a largest number of high-frequency components detected for all the extracted frames by the control unit 39-6 and focal distances of the division regions.

The control unit 39-6 compares high-frequency components of an arbitrary division region with high-frequency components of neighboring division regions around the arbitrary division region. If the high-frequency components of the arbitrary division region are much different from those of the neighboring division regions, the control unit 39-6 determines the high-frequency components of the arbitrary division region as noise and overwrites the high-frequency components of the neighboring division regions in the high-frequency components of the arbitrary division region determined as noise.

In the current embodiment of the present invention, the matching unit 39-2, the region division unit 39-3, and the high-frequency component extraction unit 39-4 may cooperate to define a focal distance calculation unit.

FIG. 7A illustrates a frame composed of division regions having a largest number of high-frequency components and focal distances of the division regions. FIG. 7B illustrates a still image composed of division regions having an optimal focal distance, e.g., 2 m.

The comparison unit 39-5 compares a focal distance of each of the division regions having a largest number of high-frequency components (as illustrated in FIG. 7A) detected by the control unit 39-6 with a focal distance of each division region of the still image as illustrated in FIG. 7B.

The comparison unit 39-5 calculates absolute values of differences between the focal distances of the division regions having a largest number of high-frequency components and the focal distances of the division regions of the still image.

The control unit 39-6 receives the absolute values of the differences between the focal distances calculated by the comparison unit 39-5 and applies background blurring to division regions of the still image, the focal distances of which are different from those of the division regions having a largest number of high-frequency components, by using a low-pass filter using corresponding differences as weight values. For example, in FIG. 7C, background blurring is not necessary for a division region having a difference of 0 (e.g., the division regions of FIGS. 7A-C that include the person). Instead, blurring is applied to division regions having a difference of 1, 2, or 3 by means of a low-pass filter using the difference value as a weight value (e.g., a value of 3 being blurred more and a value of 1 being blurred less).

When background blurring is applied, high-frequency components are extracted from the still image in order to extract portions in complete focus, the extracted portions in focus (having a difference of 0) are masked, and background blurring is applied to the other portions except for the masked portions by using weight values, thereby maximizing separation between an object and a background.

In another embodiment, instead of moving image photographing, capturing of several still images (e.g., using continuous photographing or taking several sequential photographs) may alternatively be performed. Accordingly, the above-described signal processing may be performed on the several still images instead of the frames of the moving image.

Alternatively, after background blurring may be differently applied to all frames of a moving image, only an object may be extracted by extracting high-frequency components from all the frames and may be synthesized or combined with the extracted objects.

Hereinafter, a method of blurring a background executed by the digital image processing apparatus according to an embodiment of the present invention will be described with reference to FIGS. 8 through 12. The method can be executed by the digital image processing device illustrated in FIG. 3 as a subroutine or portion of a main photographing algorithm that may be executed by one or more various components of the digital signal processing unit.

When the present method is implemented as a software application executing on a processor of the digital image processing apparatus, the amount of operation time required for the present method may have an influence upon responsiveness or shot-to-shot time in consideration of the current technology level, is 5 but the processing time can be reduced significantly by development in an ARM (advanced RISC machine) process or mounting of a separate digital signal processing (DSP) module. As a moving image of a digital image processing device is now improved from a video graphics array (VGA) level to a high definition (HD) level, the size and quality of a frame that can be extracted from the moving image are also improved and thus data required for the present invention can be finely obtained.

Figure 8:
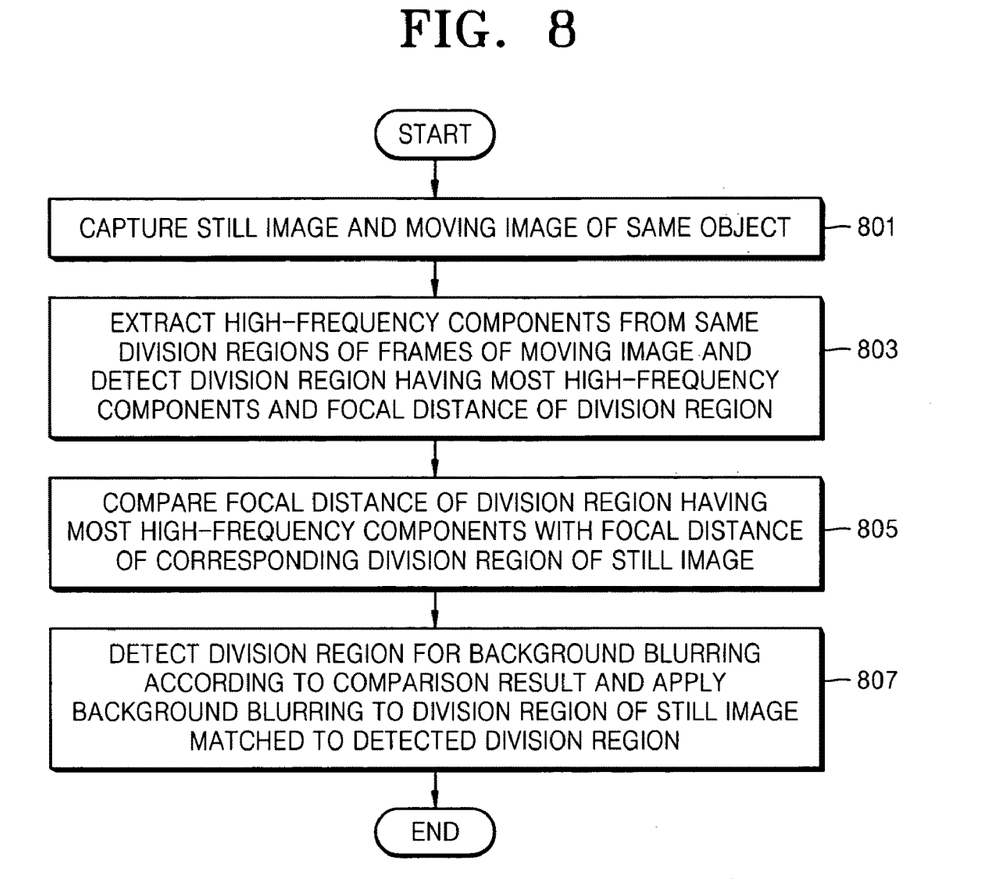
FIG. 8 is a flowchart illustrating a method of blurring a background according to an embodiment of the present invention.

FIG. 8 is a flowchart illustrating a method of blurring a background according to an embodiment of the present invention. Referring to FIG. 8, in operation 801, a moving image and a still image of the same object are captured.

Figure 9:
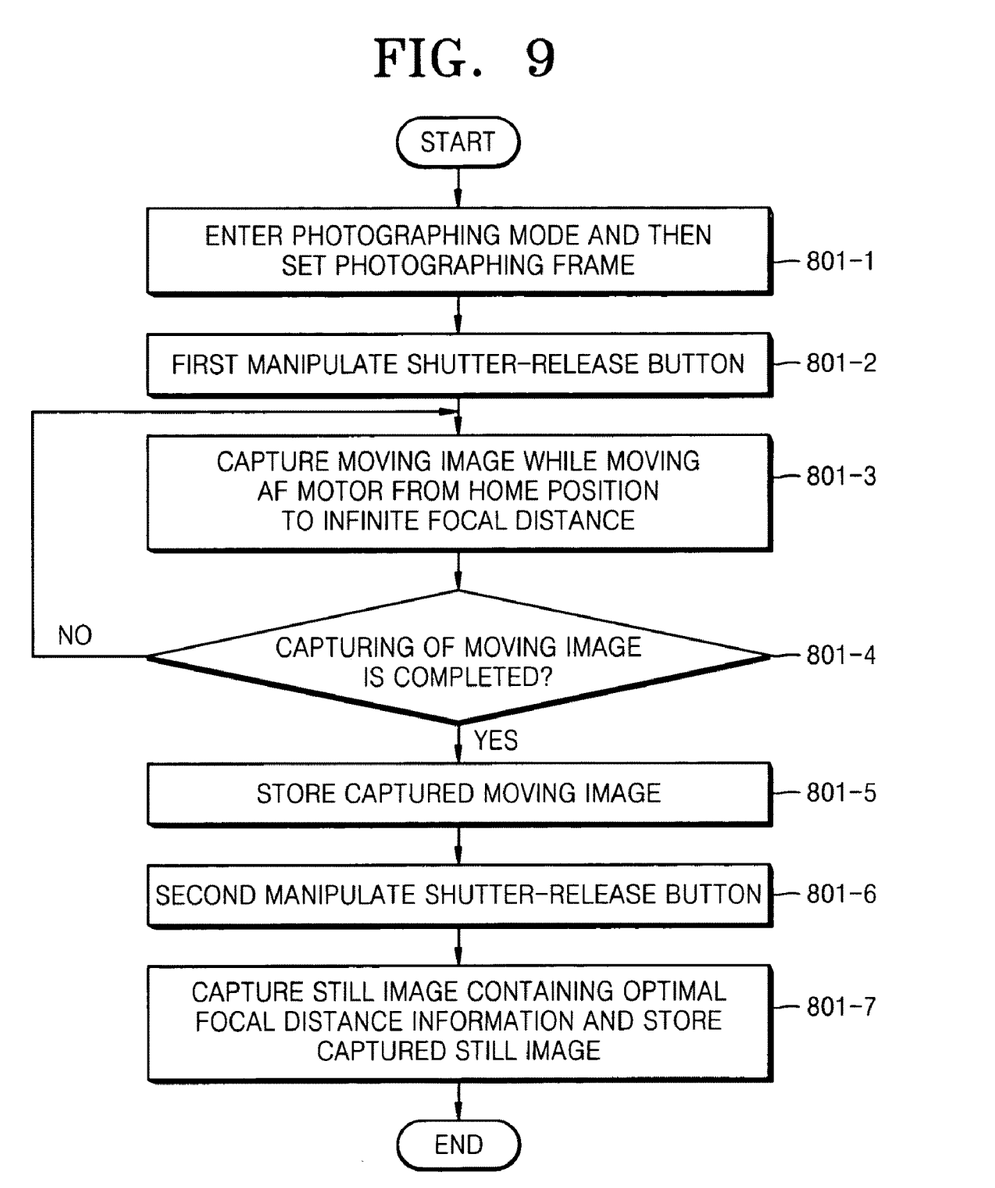
FIG. 9 is a flowchart illustrating capturing of a moving image and a still image of the same object in the method illustrated in FIG. 8.

FIG. 9 is a detailed flowchart illustrating capturing of a moving image and a still image of the same object in the method illustrated in FIG. 8.

In operation 801-1, the digital image processing device enters a photographing mode and then sets a photographing frame.

In operation 801-2, the shutter-release button 11 is first manipulated.

Upon first manipulation of the shutter-release button 11 in operation 801-2, the digital signal processing unit 39 captures a moving image while moving the AF motor from a home position up to an infinite focal distance as illustrated in FIG. 4A in operation 801-3. The moving image can be captured at a rate of 30 or 15 frames per second. Accuracy can be improved by setting a high rate of frames per second during moving image photographing.

If moving image photographing is completed by moving the AF motor from the minimum focal distance up to the infinite focal distance in response to a first manipulation of the shutter-release button 11 in operation 801-4, the photographed moving image is stored in the storing unit 37 or the buffer (not shown) in operation 801-5.

Upon a second manipulation of the shutter-release button 11 in operation 801-6, a still image containing optimal focal distance information is captured and is stored in the storing unit 37 or the buffer in operation 801-7.

Once the digital signal processing unit 39 finishes capturing the moving image and the still image of the same object, the digital signal processing unit 39 extracts high-frequency components from the same division regions of frames of the moving image, which include corresponding focal distances, and detects a division region having a largest number of high-frequency components and a focal distance of the division region in operation 803.

Figure 10:
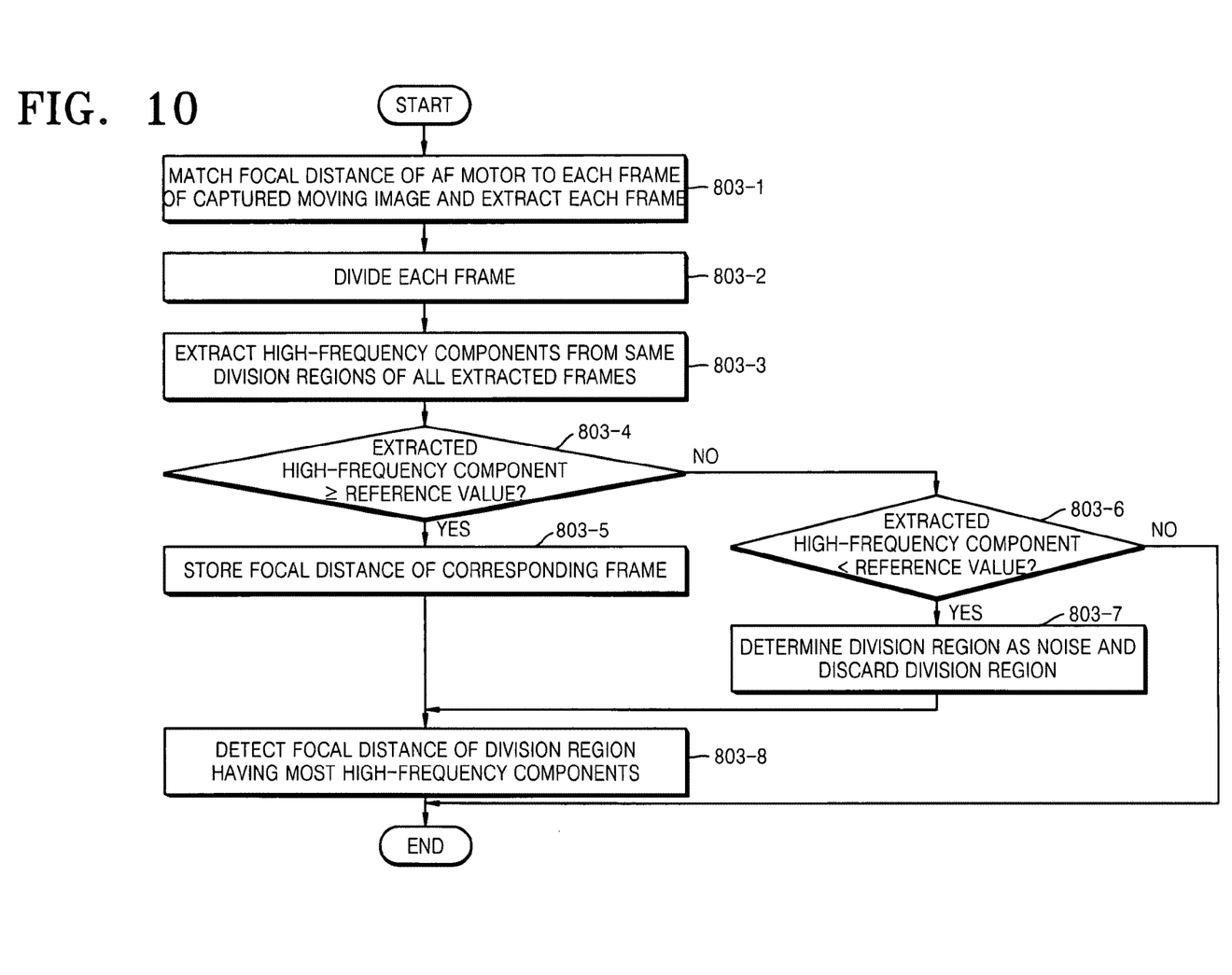
FIG. 10 is a flowchart illustrating extraction of a largest number of high-frequency components from each frame of a moving image in the method illustrated in FIG. 8.

FIG. 10 is a detailed flowchart illustrating extraction of a largest number of high-frequency components from each frame of a moving image in the method illustrated in FIG. 8.

The digital signal processing unit 39 matches a distance (focal distance) per moving time of the AF motor to each frame of the moving image stored in the storing unit 37 or the buffer and then extracts each frame in operation 803-1. For extraction of frames having accurate data, low-efficiency compression is desirable.

In operation 803-2, the digital signal processing unit 39 divides each of the extracted frames into blocks of a predetermined size, e.g., 4×4-pixel blocks, as illustrated in FIG. 5A.

Upon completion of frame region division, the digital signal processing unit 39 extracts high-frequency components from the same division regions of all the extracted frames in operation 803-3. As illustrated in FIG. 5B, the digital signal processing unit 39 extracts high-frequency components from the same division regions $A_1$ through $A_n$ of all the extracted frames, and then sequentially extracts high-frequency components from the other same division regions of the extracted frames, thereby extracting high-frequency components from all division regions of each of the extracted frames. The digital signal processing unit 39 extracts high-frequency components of an image signal by primary and secondary differentiations of brightness data of the same division regions $A_1$ through $A_n$ of all the extracted frames.

The digital signal processing unit 39 compares the extracted high-frequency components with a reference value in operation 803-4. If the extracted high-frequency component is greater than the reference value, the digital signal processing unit 39 stores a focal distance of a corresponding frame in operation 803-5.

If the extracted high-frequency component is less than the reference value, the digital signal processing unit 39 determines a corresponding division region as noise and discards high-frequency components of the division region in operation 803-7.

The digital signal processing unit 39 then detects a division region having a largest number of high-frequency components and a focal distance of the division region in operation 803-8. FIG. 7A illustrates a frame composed of division regions having a largest number of high-frequency components and focal distances of the division regions.

The digital signal processing unit 39 compares high-frequency components of an arbitrary division region with high-frequency components of neighboring division regions around the arbitrary division region. If the high-frequency components of the arbitrary division region are much different from those of the neighboring division regions, the digital signal processing unit 39 determines the high-frequency components of the arbitrary division region as noise and overwrites the high-frequency components of the neighboring division regions in the high-frequency components of the arbitrary division region determined as noise.

Once the division region having a largest number of high-frequency components and the focal distance of the division region are detected, the digital signal processing unit 39 compares the focal distance of the division region having a largest number of high-frequency components with the focal distance of the division region of the still image in operation 805.

Figure 11:
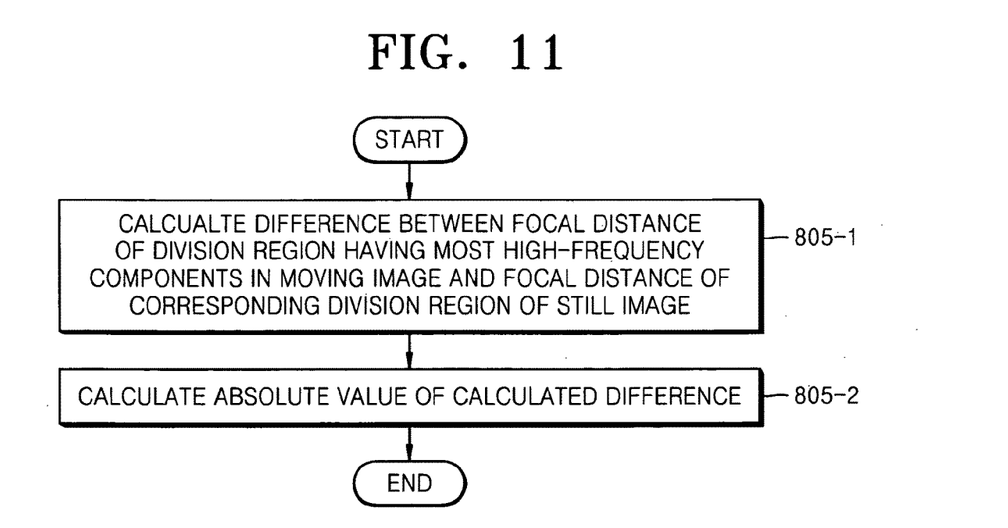
FIG. 11 is a flowchart illustrating comparison of a focal distance of a moving image frame with a focal distance of a still image in the method illustrated in FIG. 8.

FIG. 11 is a detailed flowchart illustrating comparison of a focal distance of a moving image frame having a largest number of high-frequency components with a focal distance of a still image in the method illustrated in FIG. 8.

Referring to FIG. 11, the digital signal processing unit 39 calculates differences between the focal distances of the division regions having a largest number of high-frequency components and the focal distances of the division regions of the still image in operation 805-1. FIG. 7A illustrates a frame composed of division regions having a largest number of high-frequency components and focal distances of the division regions. FIG. 7B illustrates a still image composed of division regions having an optimal focal distance, e.g., 2 m. The digital signal processing unit 39 calculates differences between the focal distances of the division regions having a largest number of high-frequency components and the focal distances of the division regions of the still image.

The digital signal processing unit 39 calculates absolute values of the calculated differences between the focal distances in operation 805-2.

Once the digital signal processing unit 39 finishes calculating the absolute values, the digital signal processing unit 39 detects a division region for background blurring and applies background blurring to a division region of a still image that matches the detected division region in operation 807.

Figure 12:
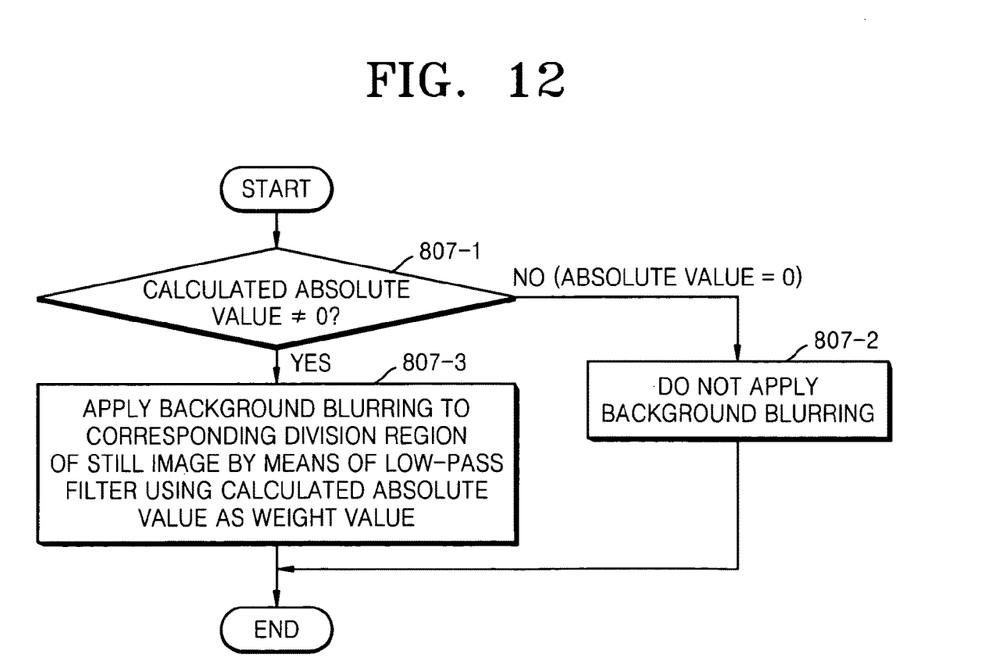
FIG. 12 is a flowchart illustrating selection of whether to apply background blurring based on a focal distance comparison result in the method illustrated in FIG. 8.

FIG. 12 is a detailed flowchart illustrating selection of whether to apply background blurring based on a focal distance comparison result in the method illustrated in FIG. 8.

In operation 807-1, upon receipt of the absolute value of the difference between the focal distances, the digital signal processing unit 39 determines whether the absolute value is 0.

If the absolute value is 0, the digital signal processing unit 39 determines that the division region of the still image is in focus and does not apply background blurring to the division region in operation 807-2.

If the absolute value is not 0, the digital signal processing unit 39 determines that the division region of the still image is out of focus and applies background blurring to the division region by means of a low-pass filter by using the absolute value as a weight value in operation 807-3. For example, in FIG. 7C, background blurring is not necessary for a division region having a difference of 0 and is applied to division regions having a difference of 1, 2, or 3 by means of a low-pass filter using the difference as a weight value.

As described above, according to the present apparatus and method, a moving image and focal distance information matched to the moving image according to a movement distance of an AF motor are obtained for the same object and background blurring is differently applied to a still image based on a focal distance, thereby obtaining an effect that is equivalent to an optical background blurring effect.

Moreover, it is possible to obtain a background blurring effect desired by a user while maintaining small size and low cost of a digital image processing device.

While the present invention has been particularly shown and described with reference to an embodiment thereof, it will be understood by those of ordinary skill in the art that various changes in form and detail may be made therein without departing from the spirit and scope of the present invention as defined by the following claims.

What is claimed is:

1. A digital image processing apparatus for blurring an image background comprising:
   an optical portion that receives light reflected from an object and includes an auto-focus lens;
   an auto-focus motor that moves the auto-focus lens;
   an imaging portion that converts the light to at least one of a moving image and a still image;
   a digital signal processing unit for comparing focal distances of frames of the moving image with a focal distance of the still image, applying background blurring to the still image according to differences between the moving image focal distances and the still image focal distance, and controlling the auto-focus motor to move the auto-focus lens from a home position to an infinite position during capturing of the moving image, the digital signal processing unit comprising:
   a focal distance calculation unit detecting the focal distances from the frames of the moving image;
   a comparison unit comparing the focal distances of the frames with the focal distance of the still image; and
   a control unit controlling background blurring to be applied to a predetermined portion of the still image in which a focal distance of the still image is different from focal distances of the frames.

2. The apparatus of claim 1, further comprising a shutter-release button, the digital signal processing unit photographing the moving image upon a first manipulation of the shutter-release button and capturing the still image upon a second manipulation of the shutter-release button after the first manipulation.

3. The apparatus of claim 1, wherein the focal distance calculation unit matches focal distance information of the AF motor to each of the frames and records the focal distance information in each of the frames.

4. The apparatus of claim 3, wherein the focal distance calculation unit comprises:
   a region division unit dividing each of the frames into predetermined regions; and
   a high-frequency component extraction unit extracting high-frequency components from same division regions of the frames,
   wherein the control unit detects a division region having a largest number of high-frequency components and a focal distance of the detected division region.

5. The apparatus of claim 4, wherein the high-frequency component extraction unit extracts the high-frequency components by differentiating brightness data of the same division regions of the frames.

6. The apparatus of claim 4, wherein the control unit compares the extracted high-frequency components with a reference value, stores a focal distance of a frame corresponding to the extracted high-frequency component that is greater than the reference value, and determines a division region corresponding to the extracted high-frequency component that is less than the reference value as noise and discards high-frequency components of the division region.

7. The apparatus of claim 4, wherein the control unit identifies as noise a division region having the high-frequency components that are different from those of neighboring division regions proximate to the division region, the control unit overwriting the high-frequency components of the neighboring division regions in the high-frequency components of the division region determined as noise.

8. The apparatus of claim 4, wherein the comparison unit calculates a difference between the focal distance of the division region having a largest number of high-frequency components and a focal distance of a corresponding division region of the still image.

9. The apparatus of claim 8, wherein the control unit applies background blurring to a division region of the still image in which a focal distance of the division region of the still image is different from that of the division region having a largest number of high-frequency components.

10. A method of blurring an image background to obtain an image having a blurred-background photographic effect, the method comprising:
   (a) capturing a moving image and a still image of the same object;
   (aa) moving an auto-focus lens with an auto-focus motor via a digital signal processing unit that controls the auto-focus motor to move the auto-focus lens from a home position to an infinite position during capturing of the moving image; and
   (b) comparing focal distances of at least one frame forming the moving image with a focal distance of the still image and applying background blurring to the still image according to differences between the moving image and still image focal distances, wherein the comparing comprises:
      (b-1) detecting the focal distances from the at least one frame of the moving image;
      (b-2) comparing the focal distances of the at least one frame with the focal distance of the still image, which is recorded at a time of the capturing of the still image; and
      (b-3) controlling background blurring of at least one portion of the still image in which the focal distance of the still image is different from that of the at least one frame.

11. The method of claim 10, wherein step (a) comprises:
   (a-1) capturing the moving image upon a first manipulation of a shutter-release button; and
   (a-2) capturing the still image upon a second manipulation of the shutter-release button after the first manipulation.

12. The method of claim 10, wherein step (b-1) comprises:
   (b-11) matching focal distance information of an AF motor to each frame of the at least one frame, and recording the focal distance information in each frame of the at least one frame;
   (b-12) dividing each frame of the at least one frame into predetermined regions;
   (b-13) extracting high-frequency components from the same division regions of the at least one frame; and
   (b-14) detecting the division region having a largest number of high-frequency components and a focal distance of the detected division region.

13. The method of claim 12, wherein step (b-13) comprises extracting the high-frequency components by differentiating brightness data of the same division regions of the at least one frame.

14. The method of claim 10, wherein step (b-2) comprises calculating a difference between the focal distance of the division region having a largest number of high-frequency components and the focal distance of a corresponding division region of the still image.

15. The method of claim 10, wherein step (b-3) comprises applying background blurring to a division region of the still image in which a focal distance of the division region of the still image is different from that of the division region having a largest number of high-frequency components.

* * * * *